United States Patent
Liu et al.

(10) Patent No.: US 8,900,028 B2
(45) Date of Patent: Dec. 2, 2014

(54) FIELD EMISSION CATHODE DEVICE MANUFACTURING METHOD

(75) Inventors: Peng Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 215 days.

(21) Appl. No.: 13/590,255

(22) Filed: Aug. 21, 2012

(65) Prior Publication Data

US 2013/0165011 A1    Jun. 27, 2013

(30) Foreign Application Priority Data

Dec. 27, 2011    (CN) .......................... 2011 1 0445058

(51) Int. Cl.
*H01J 9/12*    (2006.01)
*B82Y 99/00*    (2011.01)

(52) U.S. Cl.
USPC ............................................. 445/50; 445/25

(58) Field of Classification Search
USPC ................................................ 445/50, 25, 51
See application file for complete search history.

(56) References Cited

U.S. PATENT DOCUMENTS

| | | | |
|---|---|---|---|
| 6,605,894 B2 * | 8/2003 | Choi et al. | 313/495 |
| 2003/0122467 A1 * | 7/2003 | Cho et al. | 313/309 |
| 2004/0051432 A1 * | 3/2004 | Jiang et al. | 313/311 |
| 2010/0239850 A1 * | 9/2010 | Wang et al. | 428/323 |

* cited by examiner

*Primary Examiner* — Elmito Breval
(74) *Attorney, Agent, or Firm* — Novak Druce Connolly Bove + Quigg LLP

(57) ABSTRACT

A method for making a field emission cathode device, including the following steps: (S1) providing a substrate including a first surface, and a carbon nanotube structure defining a first portion and a second portion, the carbon nanotube structure including a plurality of carbon nanotubes, a longitudinal direction of the plurality of carbon nanotubes being from the first portion to the second portion; (S2) placing the carbon nanotube structure on the first surface of the substrate, and fastening the first portion to the substrate; and (S3) repeatedly rubbing the carbon nanotube structure along the direction from the first portion to the second portion.

20 Claims, 11 Drawing Sheets

FIELD EMISSION CATHODE DEVICE MANUFACTURING METHOD

RELATED APPLICATIONS

This application claims all benefits accruing under 35 U.S.C. §119 from China Patent Application No. 201110445058.3, filed on Dec. 27, 2011 in the China Intellectual Property Office, entire contents of which is hereby incorporated by reference.

BACKGROUND

1. Technical Field

The present disclosure relates to manufacturing methods for field emission cathode device, and particularly, to a manufacturing method for field emission cathode device using carbon nanotubes.

2. Description of Related Art

Field emission displays (FEDs) are new, rapidly developing flat panel display technologies. Generally, FEDs can be roughly classified into diode and triode structures. In particular, carbon nanotube-based FEDs have attracted much attention in recent years.

Carbon nanotubes (CNTs) produced by means of arc discharge between graphite rods were first discovered and reported in an article by Sumio Iijima, entitled "Helical Microtubules of Graphitic Carbon" (Nature, Vol. 354, Nov. 7, 1991, pp. 56-58). Carbon nanotubes are electrically conductive along longitudinal directions of the carbon nanotubes, chemically stable, and can each have a very small diameter (much less than 100 nanometers) and a large aspect ratio (length/diameter). Due to at least the above described properties, carbon nanotubes may play an important role in field of field emission devices.

Generally, a CNTs field emission cathode includes a substrate, a cathode electrode and CNTs electron emitter. The cathode electrode is located on the substrate, and the CNTs electron emitter is located on the cathode electrode, perpendicular to the substrate. One known method is to fix the CNT electron emitter on the conductive cathode electrode via a conductive paste or adhesive, and make the CNTs electron emitter perpendicular to the substrate.

However, precision and efficiency of the known method for making the CNTs field emission cathode may be low. Therefore, an improved manufacturing method for field emission cathode device using carbon nanotubes may be desired within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

The present disclosure provides a method of rubbing a carbon nanotube structure located on and parallel to a substrate, to erect at least part of the carbon nanotube structure on the substrate. The carbon nanotube structure includes a first portion and a second portion opposite to each other, and a plurality of carbon nanotubes oriented along a same direction end to end from the a first portion to the second portion. The first portion can be fastened on the substrate, and the plurality of carbon nanotubes can be parallel to the substrate. A pressure is applied on the carbon nanotube structure by a rubbing device. The second portion of the carbon nanotube structure would erect after moving the rubbing device from the first portion to the second portion. The second portion of the carbon nanotubes would erect up and can be used as a CNT field emission cathode.

Figure 1:
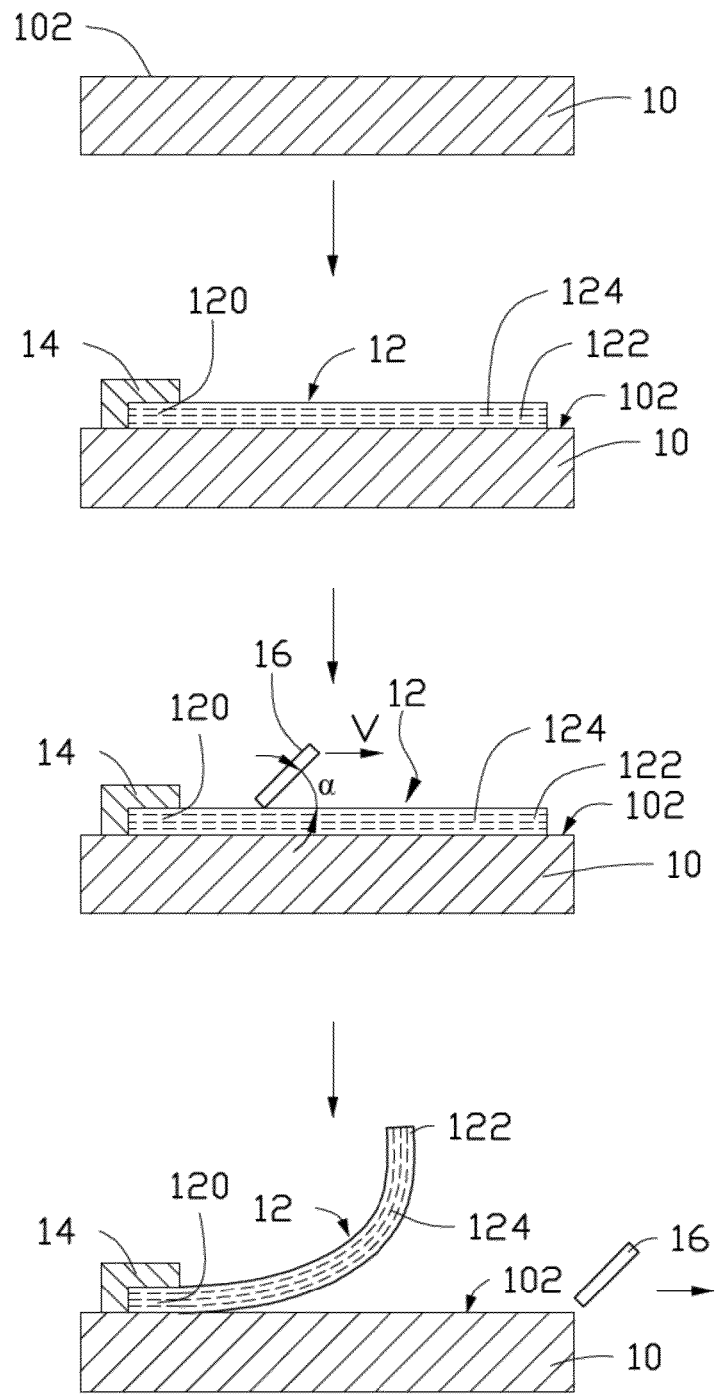
FIG. 1 shows processes of one embodiment of a method for making a carbon nanotube (CNT) field emission cathode device.

FIG. 1, is one embodiment of a method for making a CNT field emission cathode device 100 including following steps:

(S1) providing a substrate 10 including a first surface 102, and a carbon nanotube structure 12 defining a first portion 120 and a second portion 122, the carbon nanotube structure 12 including a plurality of carbon nanotubes 124, a longitudinal direction of the plurality of carbon nanotubes 124 being parallel to a direction from the first portion 120 to the second portion 122;

(S2) placing the carbon nanotube structure 12 on the first surface 102 of the substrate 10, and fastening the first portion 120 to the substrate 10;

(S3) repeatedly rubbing the carbon nanotube structure 12 along the direction from the first portion 120 to the second portion 122.

In step (S1), the substrate 10 is made of flexible materials or rigid materials. The flexible materials may be plastics, resins or fibers. The rigid materials may be ceramics, glasses, silicon, metal, or quartz. The shape and size of the substrate 10 can be determined according to practical needs. For example, the substrate 10 may be square, round or triangular.

The first surface 102 of the substrate 10 is smooth and used to support the carbon nanotube structure 12. In one embodiment, the substrate 10 is a square silicon substrate about 1 millimeter (mm) thick.

Figure 2:
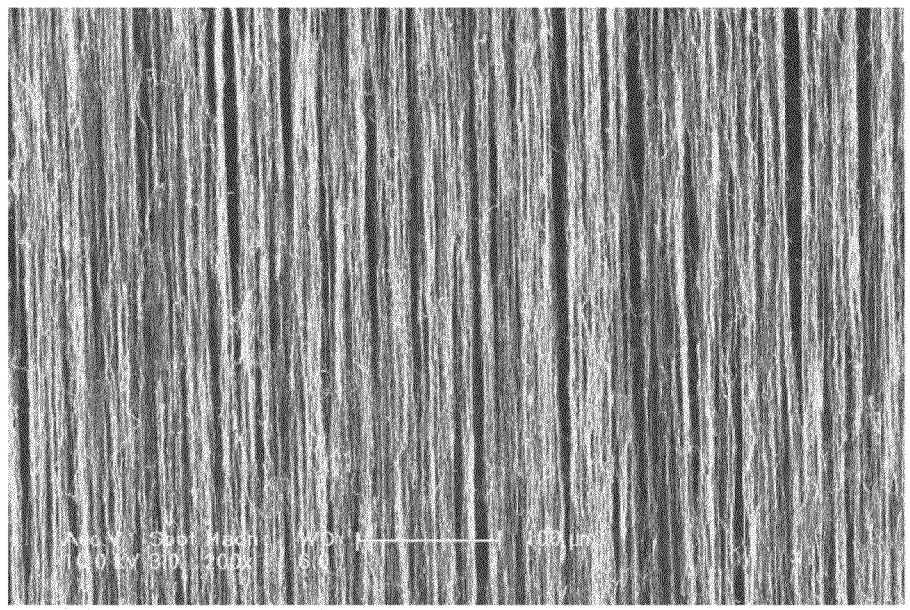
FIG. 2 shows a Scanning Electron Microscope (SEM) image of a carbon nanotube drawn film used in the process of making the CNT field emission cathode device of one embodiment.

In step (S1), the carbon nanotube structure 12 includes a plurality of carbon nanotubes 124 oriented along a same direction and joined end to end in the longitudinal direction of the carbon nanotubes 124 by van der Waals attractive force therebetween. The carbon nanotube structure 12 can be a drawn carbon nanotube film, a pressed carbon nanotube film, or a carbon nanotube wire. Some examples of the drawn carbon nanotube film and the pressed carbon nanotube film are described below. Drawn carbon nanotube film In one embodiment, the carbon nanotube structure 12 includes at least one drawn carbon nanotube film. A film can be drawn from a carbon nanotube array, to obtain a drawn carbon nanotube film. Examples of drawn carbon nanotube films are taught by U.S. Pat. No. 7,045,108 to Jiang et al., and WO 2007015710 to Zhang et al. The drawn carbon nanotube film includes a plurality of successive and oriented carbon nanotubes joined end-to-end lengthwise by van der Waals attractive force therebetween. The drawn carbon nanotube film is a free-standing film. The term "free-standing" includes, but is not limited to, a structure that does not have to be supported by a substrate and can sustain the weight of it when it is hoisted by a portion thereof without any significant damage to its structural integrity. Each drawn carbon nanotube film can include a plurality of successively oriented carbon nanotube segments joined end-to-end by van der Waals attractive force therebetween. Each carbon nanotube segment can include a plurality of carbon nanotubes 124 substantially parallel to each other, and combined by van der Waals attractive force therebetween. As can be seen in FIG. 2, some variations can occur in the drawn carbon nanotube film. The plurality of carbon nanotubes 124 in the drawn carbon nanotube film are substantially oriented along a preferred orientation from the first portion 120 to the second portion 122. A longitudinal direction of the plurality of carbon nanotubes 124 are approximately parallel to a direction from the first portion 120 to the second portion 122. The drawn carbon nanotube film can be treated with an organic solvent to increase the mechanical strength and toughness of the drawn carbon nanotube film and reduce the coefficient of friction of the drawn carbon nanotube film. The thickness of the drawn carbon nanotube film can range from about 0.5 nm to about 100 μm.

Figure 3:
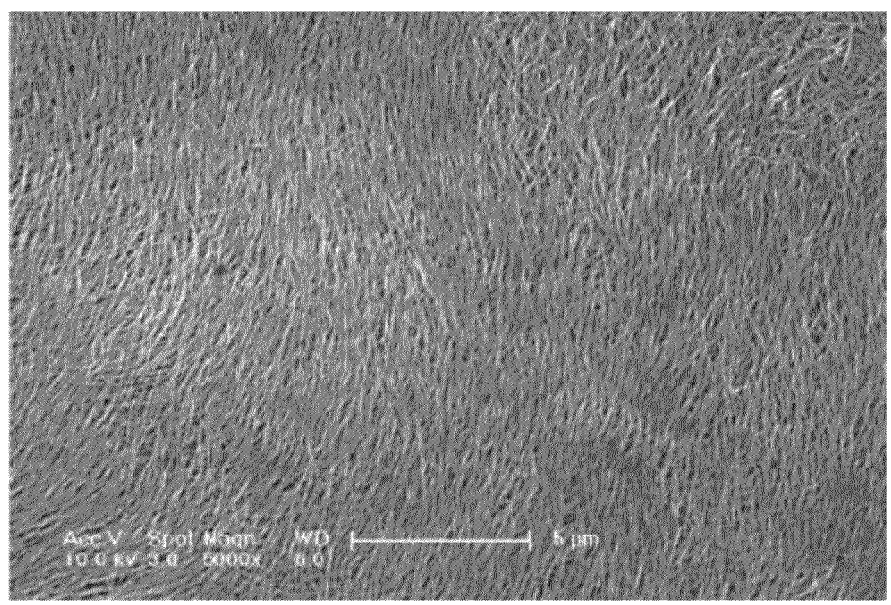
FIG. 3 shows an SEM image of a pressed carbon nanotube film used in the process of making the CNT field emission cathode device of one embodiment.
Figure 4:
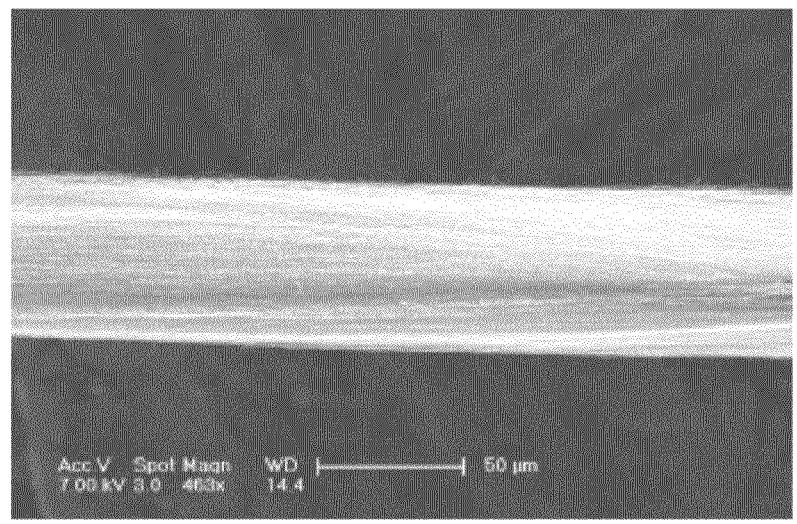
FIG. 4 shows an SEM image of an untwisted carbon nanotube wire used in the process of making the CNT field emission cathode device of one embodiment.

It is to be understood that the carbon nanotube structure 12 can include several drawn carbon nanotube film stacked with each other. The carbon nanotubes in each of the several drawn carbon nanotube film oriented along a same direction. The thickness of the carbon nanotube structure 12 can be controlled in this way.
Pressed Carbon Nanotube Film In other embodiments, the carbon nanotube structure 12 can include a pressed carbon nanotube film. Referring to FIG. 3, the pressed carbon nanotube film can be a free-standing carbon nanotube film. The carbon nanotubes in the pressed carbon nanotube film are arranged along a same direction. The carbon nanotubes in the pressed carbon nanotube film can rest upon each other and oriented along a same direction from the first portion 120 to the second portion 122. Adjacent carbon nanotubes are attracted to each other and combined by van der Waals attractive force. An angle between a primary alignment direction of the carbon nanotubes and a surface of the pressed carbon nanotube film is about 0 degrees to about 15 degrees. The greater the pressure applied, the smaller the angle obtained. An example of pressed carbon nanotube film is taught by US PGPub. 20080299031A1 to Liu et al.
Carbon Nanotube Wire In one embodiment, the carbon nanotube structure 12 is a carbon nanotube wire. The carbon nanotube wire can be untwisted or twisted. The untwisted carbon nanotube wire can be obtained by treating a drawn carbon nanotube film, drawn from a carbon nanotube array with a volatile organic solvent. Examples of drawn carbon nanotube film, also known as carbon nanotube yarn, or nanofiber yarn, ribbon, and sheet are taught by U.S. Pat. No. 7,045,108 to Jiang et al. In one embodiment, the organic solvent is applied to soak the entire surface of the drawn carbon nanotube film. During the soaking, adjacent parallel carbon nanotubes in the drawn carbon nanotube film will bundle together, due to the surface tension of the organic solvent as it volatilizes, and thus, the drawn carbon nanotube film will be shrunk into untwisted carbon nanotube wire. Referring to FIG. 4, the untwisted carbon nanotube wire includes a plurality of carbon nanotubes substantially oriented along a same direction (i.e., a direction along the length of the untwisted carbon nanotube wire). The carbon nanotubes are parallel to the axis of the untwisted carbon nanotube wire. In this embodiment, the untwisted carbon nanotube wire includes a plurality of successive carbon nanotube segments joined end to end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity and shape. Length of the untwisted carbon nanotube wire can be arbitrarily set as desired. A diameter of the untwisted carbon nanotube wire can range from about 0.5 nanometers to about 100 micrometers. Examples of carbon nanotube wire are taught by US PGPub. 20070166223A1 to Jiang et al.

Figure 5:
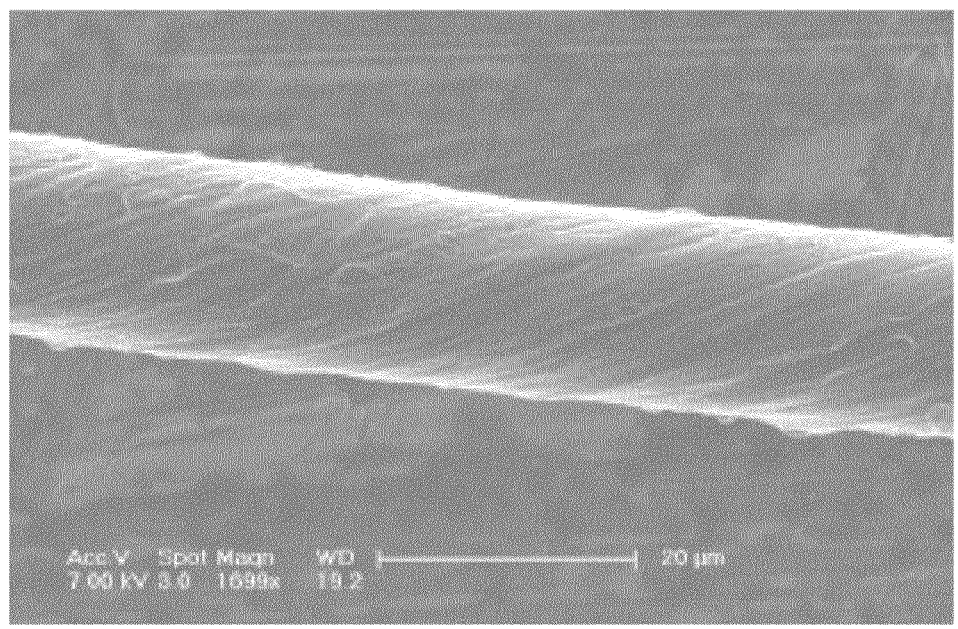
FIG. 5 shows an SEM image of a twisted carbon nanotube wire used in the process of making the CNT field emission cathode device of one embodiment.

The twisted carbon nanotube wire can be formed by twisting the drawn carbon nanotube film using a mechanical force to turn the two ends of the drawn carbon nanotube film in opposite directions. Referring to FIG. 5, the twisted carbon nanotube wire includes a plurality of carbon nanotubes helically oriented around an axial direction of the twisted carbon nanotube wire. In this embodiment, the twisted carbon nanotube wire includes a plurality of successive carbon nanotube segments joined end to end by van der Waals attractive force therebetween. Each carbon nanotube segment includes a plurality of carbon nanotubes parallel to each other, and joined by van der Waals attractive force therebetween. Length of the carbon nanotube wire can be set as desired. A diameter of the twisted carbon nanotube wire can be from about 0.5 nanometers to about 100 micrometers. Furthermore, the twisted carbon nanotube wire can be treated with a volatile organic solvent after being twisted. After being soaked by the organic solvent, the adjacent parallel carbon nanotubes in the twisted carbon nanotube wire will bundle together, due to the surface tension of the organic solvent when the organic solvent is volatilizing. The specific surface area of the twisted carbon nanotube wire will decrease, while the density and strength of the twisted carbon nanotube wire will be increased. The carbon nanotubes in the carbon nanotube wire can be single-walled, double-walled, or multi-walled carbon nanotubes.

In step (S2), the carbon nanotube structure is located on and parallel to the first surface 102. The first portion 120 of the carbon nanotube structure 12 is fastened on the substrate 10. In one embodiment, the first portion 120 is fastened on the substrate 10 by a fastening device 14. The first potion 120 is embedded between the fastening device 14 and the substrate 10. The fastening device 14 can be made of conductive materials. In one embodiment, the first portion 120 is adhered on the substrate 10 by adhesive material. The carbon nanotube structure 12 spreads on the substrate 10 and only the first portion 120 is fastened on the substrate 10.

It is to be understood that, a binder can also be used to combine the first portion 120 with the substrate 10. In one embodiment, a binder layer or binder points can be located on the first surface 102 of the substrate 10. The first portion 120 of the carbon nanotube structure 12 can be adhered on the substrate 10 via the binder layer or binder points.

In step (S3), a rubbing device 16 is used to rub the carbon nanotube structure 12 along a direction V. The direction V is parallel to the surface of the substrate 10. The shape of the rubbing device 16 can be a rod, board, or ball, according to the shape of the carbon nanotube structure 12. A pressure is applied on the carbon nanotube structure 12 by the rubbing device 16, and the rubbing device 16 is moved from the first portion 120 to the second portion 122 repeatedly until the second portion 122 is erected up from the substrate 10.

Figure 6:
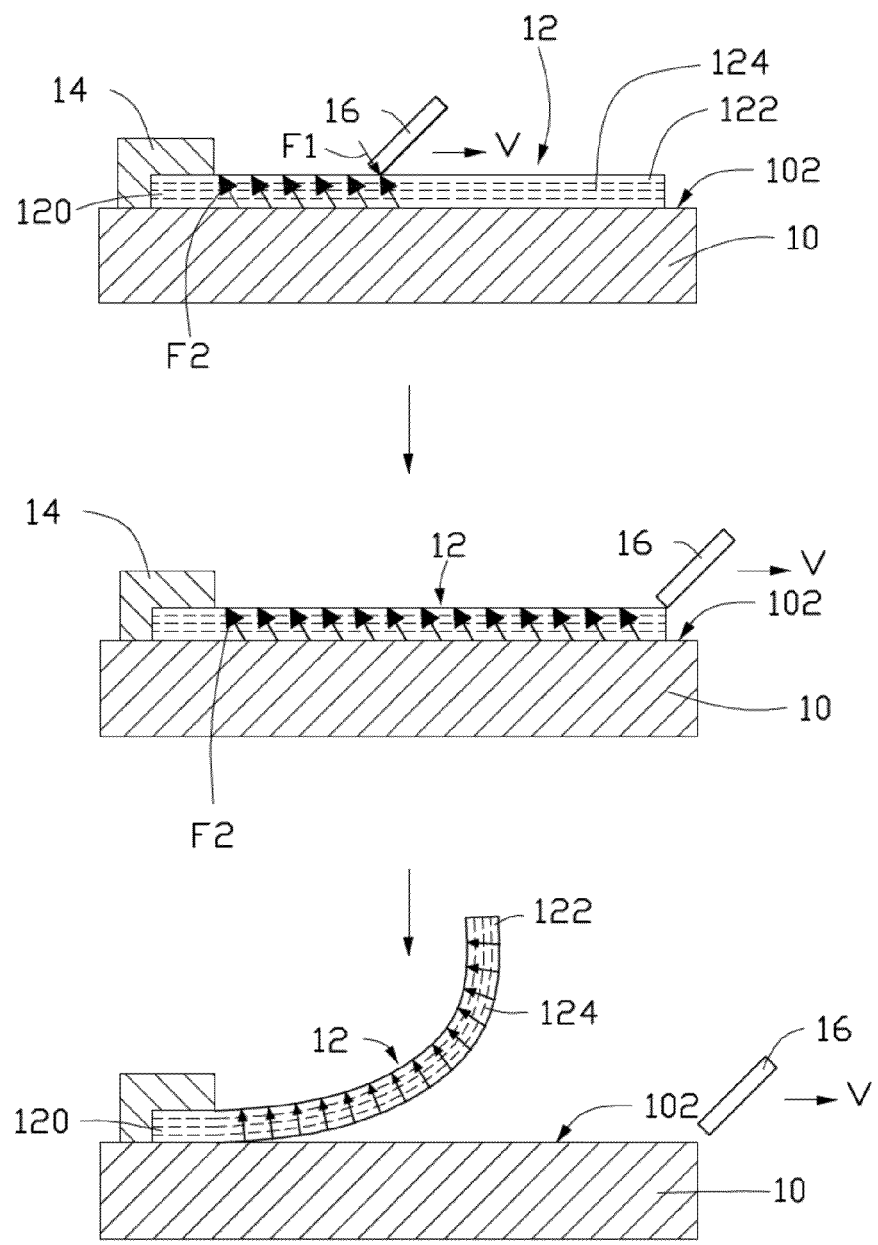
FIG. 6 illustrates principles of the method of FIG. 1.

FIG. 6, shows when the rubbing device 16 rubs the carbon nanotube structure 12 from the first portion 120 to the second portion 122, a stress F2 is come into being to withstand the pressure F1 applied on the carbon nanotube structure 12 in the rubbing process. Because the first portion 120 of the carbon nanotube structure 12 is fastened on the substrate 10, the second portion 122 would erect up and curve to discharge the stress F2 in the carbon nanotube structure 12 when the rubbing device 16 leaves the second portion 122 during the rubbing process. After rubbing process, the carbon nanotube structure 12 curves from the second portion 122 away of the substrate, therefore a curve surface or a curve line is formed. A bending angle is formed between the first surface 102 of the substrate 10 and a tangent surface or line. The bending angle is in a range from about 0 degrees to about 180 degrees. In one embodiment, the bending angle is in a range from about 60 to about 90 degrees. The carbon nanotube structure 12 can work as a CNT field emission cathode according to the application.

In step (S3), the pressure applied on the carbon nanotube structure 12 can be in a range from about 1 Pa to about $10^9$ Pa. In one embodiment, the carbon nanotube structure 12 having a thickness of 10 micrometers, and the pressure applied on the carbon nanotube structure 12 is $0.5 \times 10^6$ Pa. In one embodiment, the rubbing device 16 is a square board, an angle $\alpha$ between the square board and the carbon nanotube structure 12 is in a range from about 30 degrees to about 80 degrees. In one embodiment, the rubbing device 16 is moved on the carbon nanotube structure 12 at a speed in a range from about 1 millimeter/second (mm/s) to about 1 meter/second (m/s). In another embodiment, the rubbing device 16 is moved on the carbon nanotube structure 12 at a speed in a range from about 10 centimeter/second (cm/s) to about 95 cm/s.

Figure 7A:
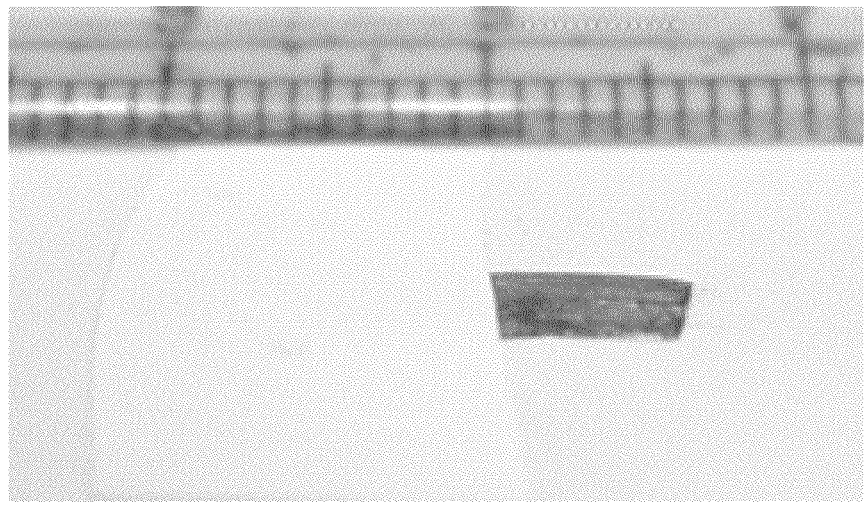
FIG. 7A is a digital photo of the carbon nanotube drawn film of FIG. 2.
Figure 7B:
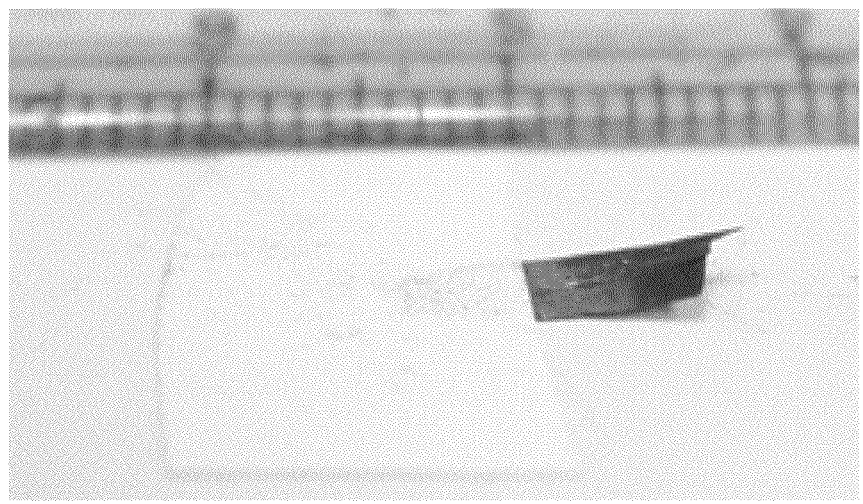
FIG. 7B a digital photo of the carbon nanotube drawn film of FIG. 7A after being treated according to the processes of FIG. 1.

FIG. 7A, is a drawn carbon nanotube located on the substrate. The first portion of the drawn carbon nanotube is adhered on the substrate by adhesive tape. FIG. 7B, shows the second portion of the drawn carbon nanotube is curved.

Figure 8:
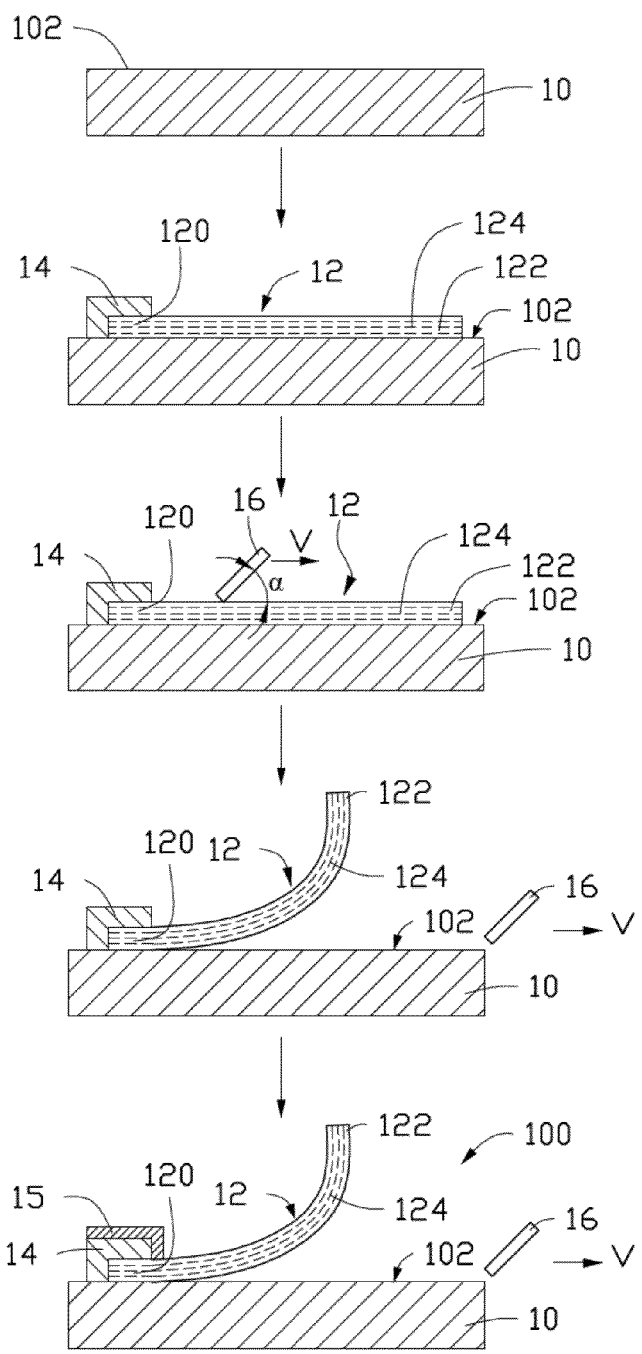
FIG. 8 shows processes of making an electrode on the CNT field emission cathode device of FIG. 1.

FIG. 8, shows an electrode 15 can be formed on the first portion 120 of the carbon nanotube structure 12. In one embodiment, the electrode 15 is a conductive layer formed by electron beam evaporation, thermal evaporation or sputtering. The fastening device 14 can be used as electrode when the material of the fastening device 14 is conductive material.

Figure 9:
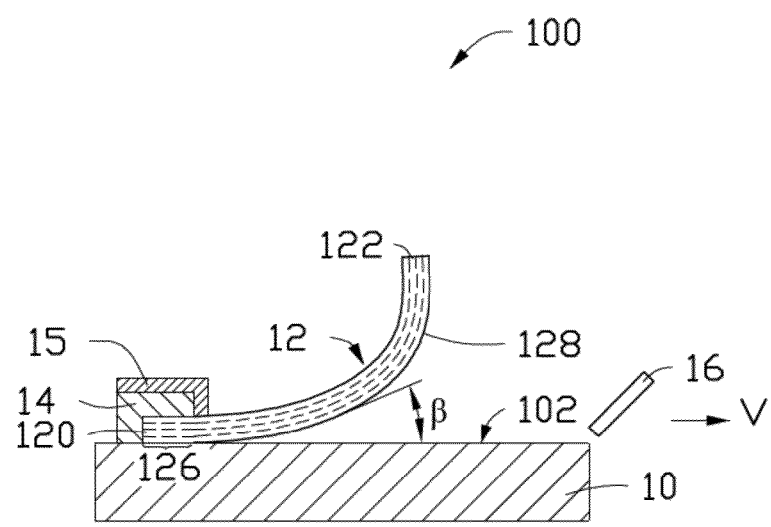
FIG. 9 shows a cross-sectional view of the CNT field emission cathode device made according to the processes of FIG. 1.

FIG. 9, shows the first portion 120 of the carbon nanotube structure 12 fastened on the substrate 10. The carbon nanotube structure 12 is curved away from the substrate 10 at the second portion 122. The carbon nanotube structure 12 includes a contact body 126 contacted to the substrate 10, and an emission body 128 curved away from the substrate 10. The contact body 126 can be greater than or equal to the first portion 120. An electrode 15 is located on and electrically connected to the contact body 126. In another embodiment, the electrode 15 is not needed when the fastening device 14 is made of conductive material. The fastening device 14 can be worked as a cathode electrode. The plurality of carbon nanotubes 124 are joined end to from the contact body 126 to the emission body 128 in the carbon nanotube structure 12. A bending angle $\beta$ between the tangent line or surface of the emission body 128 and the first surface 102 of the substrate 10 is in a range from about 30 degrees to about 150 degrees. In one embodiment, the angle is 90 degrees.

Figure 10:
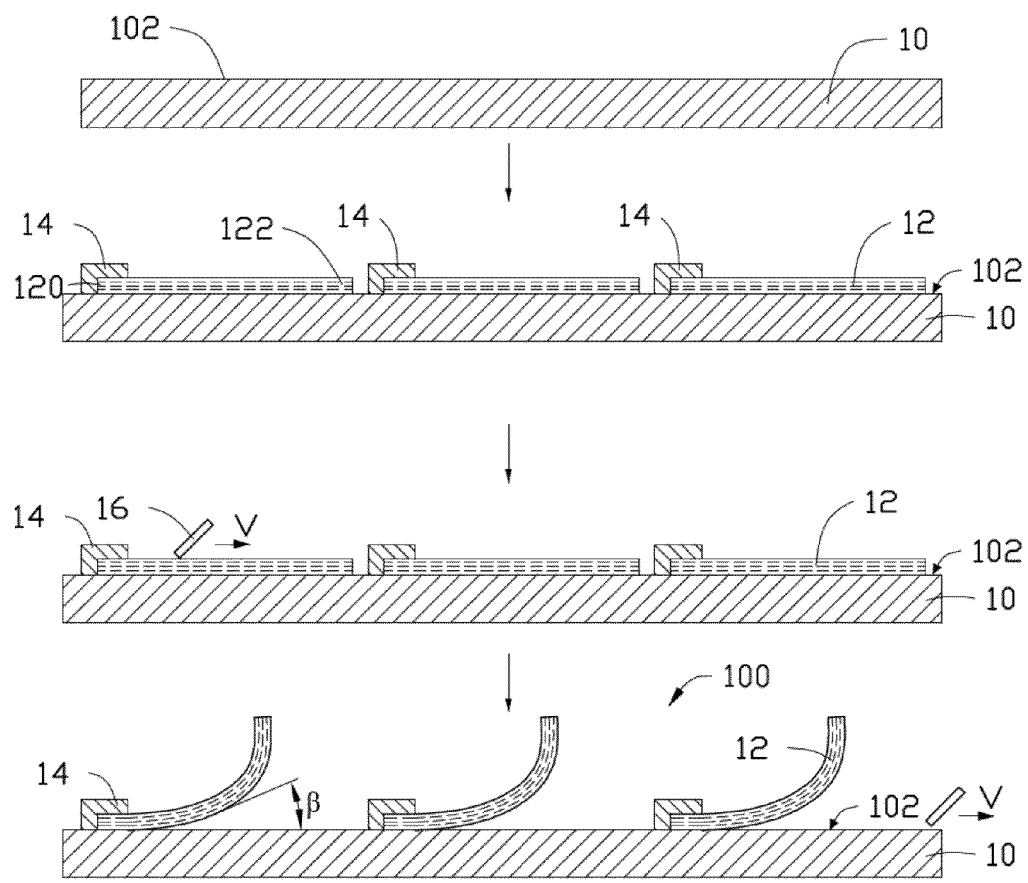
FIG. 10 shows processes of another embodiment of a method for making a CNT field emission cathode device.

FIG. 10, is one embodiment of a method for making a CNT field emission cathode device 200 includes following steps:

(S1) providing a substrate 10 including a first surface 102, and a plurality of carbon nanotube structures 12, each of the plurality of carbon nanotube structures 12 defining a first portion 120 and a second portion 122, each of the plurality of carbon nanotube structures 12 including a plurality of carbon nanotubes 124, a longitudinal direction of the plurality of carbon nanotubes 124 being approximately parallel to a direction from the first portion 120 to the second portion 122;

(S2) placing the plurality of carbon nanotube structures 12 on the first surface 102 of the substrate 10, each of the carbon nanotube structures being spaced from each other; and (S3) repeatedly rubbing the plurality of carbon nanotube structures 12 along the direction from the first portion 120 to the second portion 122.

In step (S2), the plurality of carbon nanotube structures 12 are located on the substrate one by one, and separate with each other. Each of the first portions 120 of the plurality of carbon nanotube structures 12 is faced to the second portion 122 of the adjacent carbon nanotube structure 12. Therefore, the plurality of carbon nanotube structures 12 can be rubbed by the rubbing device 14 at the same time, along a direction from the first portion 120 to the second portion 122. A plurality of a CNT field emission cathode is formed.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A field emission cathode device manufacturing method, comprising the following steps:
   (S1) providing a substrate comprising a first surface, and a carbon nanotube structure defining a first portion and a second portion, the carbon nanotube structure comprising a plurality of carbon nanotubes, a longitudinal direction of the plurality of carbon nanotubes being approximately parallel to a direction from the first portion to the second portion;
   (S2) placing the carbon nanotube structure on the first surface of the substrate, and fastening the first portion to the substrate; and (S3) repeatedly rubbing the carbon nanotube structure along the direction from the first portion to the second portion.

2. The field emission cathode device manufacturing method of claim 1, wherein the carbon nanotubes in the carbon nanotube structure are joined end to end in the longitudinal direction by van der Waals attractive force therebetween.

3. The field emission cathode device manufacturing method of claim 1, wherein the carbon nanotube structure comprises a drawn carbon nanotube film, a pressed carbon nanotube film, or a carbon nanotube wire.

4. The field emission cathode device manufacturing method of claim 1, wherein in step (S2), the first portion is fastened on the first surface of the substrate by a fastening device.

5. The field emission cathode device manufacturing method of claim 4, wherein the fastening device is made of a conductive material.

6. The field emission cathode device manufacturing method of claim 1, wherein in step (S3), the carbon nanotube structure is repeatedly rubbed by a rubbing device having a shape of a rod, a board, or a ball.

7. The field emission cathode device manufacturing method of claim 6, the step (S3) further comprising rubbing the carbon nanotube structure by holding the rubbing device at an angle between the square board and the carbon nanotube structure, wherein the rubbing device is a square board, the angle between the square board and the carbon nanotube structure is in a range from about 30 degrees to about 80 degrees.

8. The field emission cathode device manufacturing method of claim 6, step (S3) further comprises moving the rubbing device on the carbon nanotube structure at a speed in a range from about 1 millimeter/second (mm/s) to about 1 meter/second (m/s).

9. The field emission cathode device manufacturing method of claim 1, step (S3) comprises applying a pressure on the carbon nanotube structure, the pressure being in a range from about 1 Pascal (Pa) to about $10^9$ Pa.

10. The field emission cathode device manufacturing method of claim 1, comprising step (S4) following step (S3), wherein step (S4) comprises curving the carbon nanotube structure curve from the second portion away of the substrate thereby forming a curve surface or a curve line.

11. The field emission cathode device manufacturing method of claim 10, step (S4) comprising forming a bending angle, wherein the bending angle being defined between the first surface and a tangent surface, or between the first surface and a tangent line.

12. The field emission cathode device manufacturing method of claim 11, wherein the bending angle is in a range from about 60 degrees to about 90 degrees.

13. A field emission cathode device manufacturing method, comprising the following steps:
(S1) providing a substrate comprising a first surface, and a plurality of carbon nanotube structures, each of the carbon nanotube structures defining a first portion and a second portion, each of the carbon nanotube structures comprising a plurality of carbon nanotubes, a longitudinal direction of the plurality of carbon nanotubes being approximately parallel to a direction from the first portion to the second portion;
(S2) placing the plurality of carbon nanotube structures on the first surface of the substrate, each of the carbon nanotube structures being spaced from each other; and
(S3) repeatedly rubbing the plurality of carbon nanotube structures along the direction from the first portion to the second portion.

14. The field emission cathode device manufacturing method of claim 13, wherein in step (S2), the plurality of carbon nanotube structures are located on the substrate isolated, and separate from each other.

15. The field emission cathode device manufacturing method of claim 13, the step (S3) further comprising rubbing the carbon nanotube structures by holding the rubbing device at an angle between the square board and each of the carbon nanotube structures, wherein the carbon nanotube structures are rubbed by a square board, the angle between the square board and each of the carbon nanotube structures is in a range from about 30 degrees to about 80 degrees.

16. The field emission cathode device manufacturing method of claim 13, step (S3) further comprises moving the rubbing device on the carbon nanotube structure at a speed in a range from about 1 millimeter/second (mm/s) to about 1 meter/second (m/s).

17. The field emission cathode device manufacturing method of claim 13, step (S3) comprises applying a pressure is applied on the carbon nanotube structure, the pressure being in a range from about 1 Pascal (Pa) to about $10^9$ Pa.

18. The field emission cathode device manufacturing method of claim 13, comprising step (S4) following step (S3), wherein step (S4) comprises curving each of the carbon nanotube structures from the second portion away of the substrate thereby forming a curve surface or a curve line.

19. The field emission cathode device manufacturing method of claim 18, the step (S4) comprising forming a bending angle, wherein the bending angle being defined between the first surface and a tangent surface, or between the first surface and a tangent line.

20. The field emission cathode device manufacturing method of claim 19, wherein the bending angle is in a range from about 60 degrees to about 90 degrees.

* * * * *